United States Patent [19]

Yuan

[11] 4,240,268

[45] Dec. 23, 1980

[54] GROUND COLD STORAGE AND UTILIZATION

[76] Inventor: Shao W. Yuan, 6701 Montour Dr., Falls Church, Va. 22043

[21] Appl. No.: 951,518

[22] Filed: Oct. 13, 1978

[51] Int. Cl.³ .......................... A25D 23/12; F24H 7/00
[52] U.S. Cl. ........................................ 62/260; 126/400
[58] Field of Search ................... 62/260, 119; 165/45; 60/0.5; 126/400

[56] References Cited

U.S. PATENT DOCUMENTS

| Re. 26,387 | 5/1968 | Balch | 62/222 |
|---|---|---|---|
| 3,195,619 | 7/1965 | Tippmann | 62/119 |
| 3,472,314 | 10/1969 | Balch | 62/260 |
| 3,848,424 | 11/1974 | Rhea | 62/119 |
| 4,010,731 | 3/1977 | Harrison | 126/400 X |
| 4,011,736 | 3/1977 | Harrison | 62/260 |
| 4,042,012 | 8/1977 | Perry | 62/260 |
| 4,091,636 | 5/1978 | Margen | 165/45 |
| 4,111,189 | 9/1978 | Dizon | 126/400 |

*Primary Examiner*—Lloyd L. King

[57] ABSTRACT

A system for transmitting, storing and utilizing cold which includes the use of heat pipes for transmitting the winter cold to freeze the ground water storage, and two-phase flow pipes to effectively cool the warm air passing through the flow pipes in the air conditioning duct. The system provides for long-duration earth storage of the winter cold which can be effectively used during summer seasons for cooling homes, buildings and other structures.

The two-phase flow pipes, characterized by having irreversible vapor flow, include a pump arrangement for transferring working fluid from the condenser section to the evaporator section of the flow pipes where phase-change is taken place by absorbing heat from the passing warm air.

11 Claims, 3 Drawing Figures

GROUND COLD STORAGE AND UTILIZATION

BACKGROUND OF THE INVENTION

1. Field of the Invention

The present invention relates to utilizing winter cold more particularly to transmitting and storing winter cold underground for effective uses during summer seasons.

2. Description of the Prior Art

Prior art ground cold storage systems are generally accomplished by blowing winter cold ambient air to pass through the cold reservoir formed by crushed stones and rock beds. In other cases, cold liquid medium is pumped through pipes embedded in stone and rock medium in the form of which constitutes a closed heat-exchange system.

The stones and rocks, as a cold storage reservoir, have several shortcomings. First, cold storage capacities are limited because of the narrow temperature range for cooling. In other words, the difference of storage temperature in winter and upperlimit useful temperatures in summer is less than thirty degrees Fahrenheit (30° F. to 60° F.). For example, in a volume of one cubic foot of stone at a temperature difference of 30° F., the energy flux is about $1.3 \times 10^3$ BTU. Assuming a summer requirement of $25 \times 10^6$ BTU for an average size home, a volume of cold storage required for cooling is estimated at $20 \times 10^3$ cubic feet. In contrast to this large volume, if ice is used for cold storage instead of rock, the required storage volume is about $2.5 \times 10^3$ cubic feet.

Another shortcoming of the stone and rocks as cold storage is the low thermal conductivity. It would require a long length of liquid pipes and considerable pumping power in order to meet the maximum cooling rate required during hot summer days.

SUMMARY OF THE INVENTION

The present invention relates to a system for transmitting, storing and utilizing winter cold, and more particularly, to a system in which winter cold can be stored underground for subsequent cooling utilization during summers without relying on conventional air-conditioning systems.

The invention contemplates a novel system for transmitting, storing and utilizing cold wherein the system comprises means for transmitting the winter cold above ground to freeze water in a reservoir below the surface of the ground, and circulation means to circulate the stored cold to the ventilation air duct which cools and dehumidifies the returning warm air flow from the space cooling in an air-conditioning system.

For accomplishing the foregoing objective, the invention contemplates the use of heat pipes for transmission of the winter cold to an underground water tank. The water in the tank is cooled and finally frozen during the winter season. Since the condenser section of the heat pipe is above the surface of the ground and the evaporator section is below, neither pump nor thermostat control is required for this system. Furthermore, since the latent heat of vaporization required to change the cold liquid (antifreeze) to vapor in the evaporator section of the heat pipe is about seven times greater than the heat of fusion delivered by converting water to ice, the proposed system for establishing ice storage is technically most efficient. However, alternative means by circulating antifreeze through pipes from cold surroundings above the ground into underground water tank may be used if required.

The extraction of cold from the cold storage for space cooling is accomplished by pumping cold liquid through a closed piping loop. When air conditioning is in operation the cold liquid is pumped from the piping loop in the cold storage to a bank of two-phase flow pipes situated in the ventilation air duct. The two-phase flow pipe is equivalent to the vaporator section of a heat pipe. As the returning warm air from rooms or other environment passes through the two-phase flow pipes in the ventilation air duct, it loses heat to the coolant in the pipes so that the liquid in the wick of the pipe vaporizes. The vaporized working fluid then flows downwardly through the piping loop to the cold storage tank where the vapor condenses. The condensed vapor or cold liquid is again pumped back to the bank of two-phase flow pipes. As mentioned previously, the phase change from cold liquid to vapor in the two-phase flow pipes requires latent heat of vaporation which is supplied by the returning warm air in the ventilation air duct. Thus, the highly effective means for space cooling described in this invention is evident.

Accordingly, an important object of the invention is to provide for long-duration underground storage of winter cold which can be used for space cooling in homes and buildings, etc., when air conditioning is required, without relying on energy from fossil fuel such as conventional air conditioning units.

Another important object of the invention is to provide a highly efficient means for transmitting cold from the subfreezing atmosphere or environment into the ground for cold storage through the use of heat pipes without the aid of energy consumption pumps and thermostatic control.

A further and important object of the invention is to provide means to freeze water in the cold storage; thereby a considerable storage volume can be reduced for the same cold storage capacity.

A still further important object of the invention is to provide an efficient means for transferring cold from storage for space cooling through the use of two-phase flow pipes including an evaporator section placed inside the ventilation air duct and a condenser section placed in the cold storage, and pump means for transferring the cold liquid, after phase change from vapor to liquid, from the condenser section to the evaporator section.

A still further object of the invention is to provide means to utilize the latent heat of evaporation required for phase change of the liquid in the two-phase flow pipes to efficiently cool the returned warm air from space cooling in the ventilation air duct of the air-conditioning system.

A still further object of the invention is to provide a very quiet air-conditioning system which is free from compressor noise.

A still further object of the invention is to provide an economical air-conditioning system which is almost free from maintenance and utility costs.

Further objects and advantages of my invention will become apparent from an understanding of the following detailed description of preferred embodiments of my invention.

DESCRIPTION OF THE PREFERRED EMBODIMENT

Figure 1:
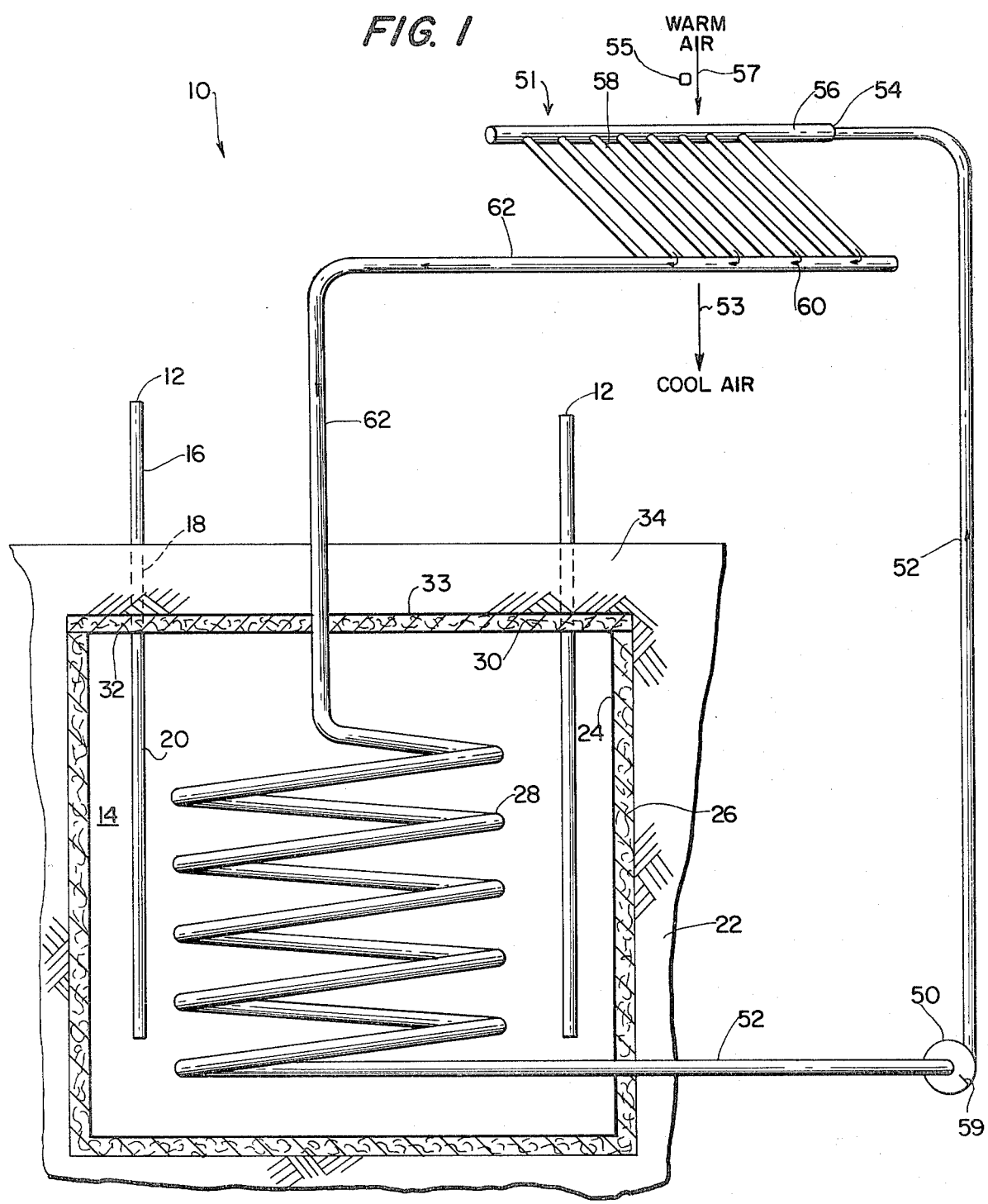
FIG. 1 is a diagrammatic sectional view of a system for transmitting, storing and utilizing cold in accordance with the present invention.

Referring to FIG. 1, the novel transmitting, storing and utilizing system of atmospheric cold, generally indicated by numeral 10, includes a series of conventional heat pipes 12 for collecting and transmitting cold above the ground into an underground water tank 14. The heat pipe includes a condenser section 16, an adiabatic section 18, and an evaporator section 20. The particular details of construction and function for the heat pipes 12 will be later described in connection with FIG. 3. Briefly, however, cold is absorbed by the condenser section 16 which causes the vapor therein to condense, and the condensed liquid then flows downward through the adiabatic section 18 to the evaporator section 20 which is located inside the water tank 14. The water in the storage tank 14 is cooled and hence, the liquid in the evaporator section 20 changes its phase to vapor which flows upward to the condenser section 16 of the heat pipe 12.

At a location 22, represented by a volume of earth where the cold storage tank 14 is embedded. The cold storage tank 14 is formed by plastic liners 24 against flexible insulation 26. The shape of the tank can be cylindrical, cubic or any other suitable form which is filled with water. The water is cooled by winter cold through the action of heat pipes 12 throughout the full depth, and finally formation of ice is achieved. As the ice is formed the expansion volume of the tank is absorbed by the flexible insulation 26 adjacent to the plastic liners 24 so that there is no danger of cracking pipes 12 and coils 28 inside the tank 14.

In order to prevent the penetration of summer heat to the cold storage tank 14, a layer of insulating material 30 is placed above the cover 32 of the tank. It is preferable that the insulating material 30 is covered by a sheet of plastic 33 which in turn is covered by a thick layer of soil 34. The above description constitutes the constructional details of the cold storage reservoir.

When it is desired to use the cold that has been stored in the tank 14, the thermostatically controlled pump 50 will be set in operation. The function of pump 50 is to deliver the cold liquid or coolant in the coil 28 through pipe 52 and entrance pipe 54 to the manifold 56 located inside the ventilation air duct 51. The delivery pipe 52 is well insulated by, e.g., conventional fiber glass pipe insulation tube. The manifold 56 is connected to a bank of two-phase flow pipes 58 which are similar to the evaporator section of a heat pipe. Each of two-phase flow pipes 58 is lined with a wick section 80 (see FIG. 2) which absorbs the coolant from the cold storage through delivery pipe 52 and manifold 56.

As the complete air conditioning system in a cooling environment is in operation, the warm air (indicated by arrow 57) from the returning duct passes through the bank of two-phase flow pipes 58, thereby causing the coolant to vaporize, as indicated by the arrow 60. The vapor then flows under pressure downwardly through the insulated pipe 62 to condenser coils 28 in the cold storage tank or region 14 where the vapor condenses under influence of the cold ice. The condensed cold liquid is then pumped back to the bank of two-phase flow pipes through the delivery pipe 52 and manifold 56, to close the loop in my cooling system. It is an important part of the system that the latent heat of vaporation during the phase change from liquid to vapor in the two-phase flow pipe 58 (see FIG. 2) is two orders of magnitude greater than the heat absorbed by the same coolant but without phase change. In other words, the cooling efficiency (absorbing heat from passing warm air 57) of the two-phase flow piping system described above is by far greater than the single-fluid flow piping system used in conventional water cooling systems.

Figure 2:
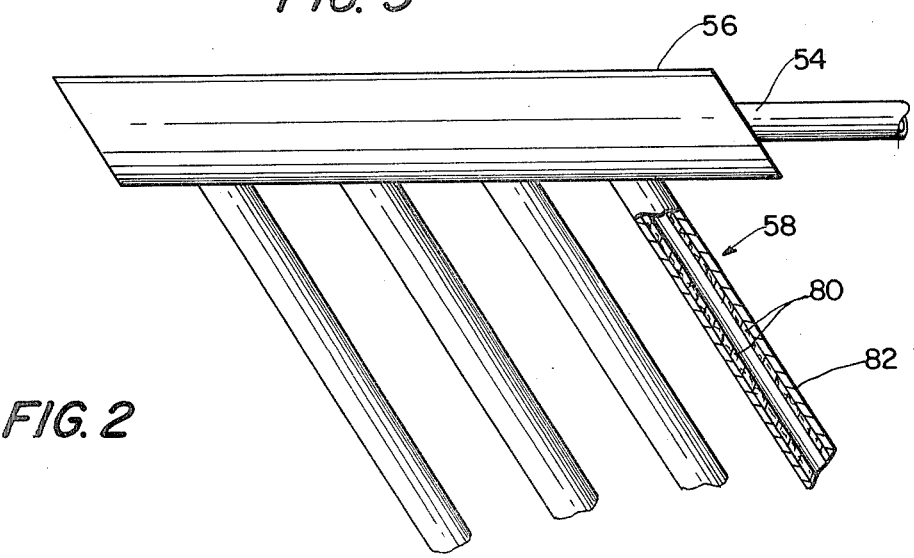
FIG. 2 is an enlarged fragmentary view of two-phase flow pipes located in ventilation air ducts of a cooling system.

FIG. 2 illustrates the constructional details of a preferred two-phase flow pipe 58 which is utilized in the cooling phase of the air-conditioned environment. The two-phase flow pipe 58 is lined with a wick 80 adjacent to the inside of the pipe wall 82. As the working liquid (not illustrated) enters the two-phase flow pipe 58 from the manifold 56, it is absorbed by the wick 80. The returned warm air (indicated by arrow 57 in FIG. 1) then causes the phase change of the working fluid from liquid to vapor form, and the warm air 57 becomes cool air (indicated by arrow 53) which is circulated throughout the house or other environment which is to be cooled.

When the air-conditioned environment reaches a desired temperature by the cooling system, the pump 50 will be shut off automatically by an electronic or electromechanical thermostatic control 59 which is connected to and actuated by a temperature sensor 55 that monitors the temperature of the warm air. As mentioned previously, the same thermostat control will start the pump 50 when the preset temperature of the air-conditioned environment is reached.

Figure 3:
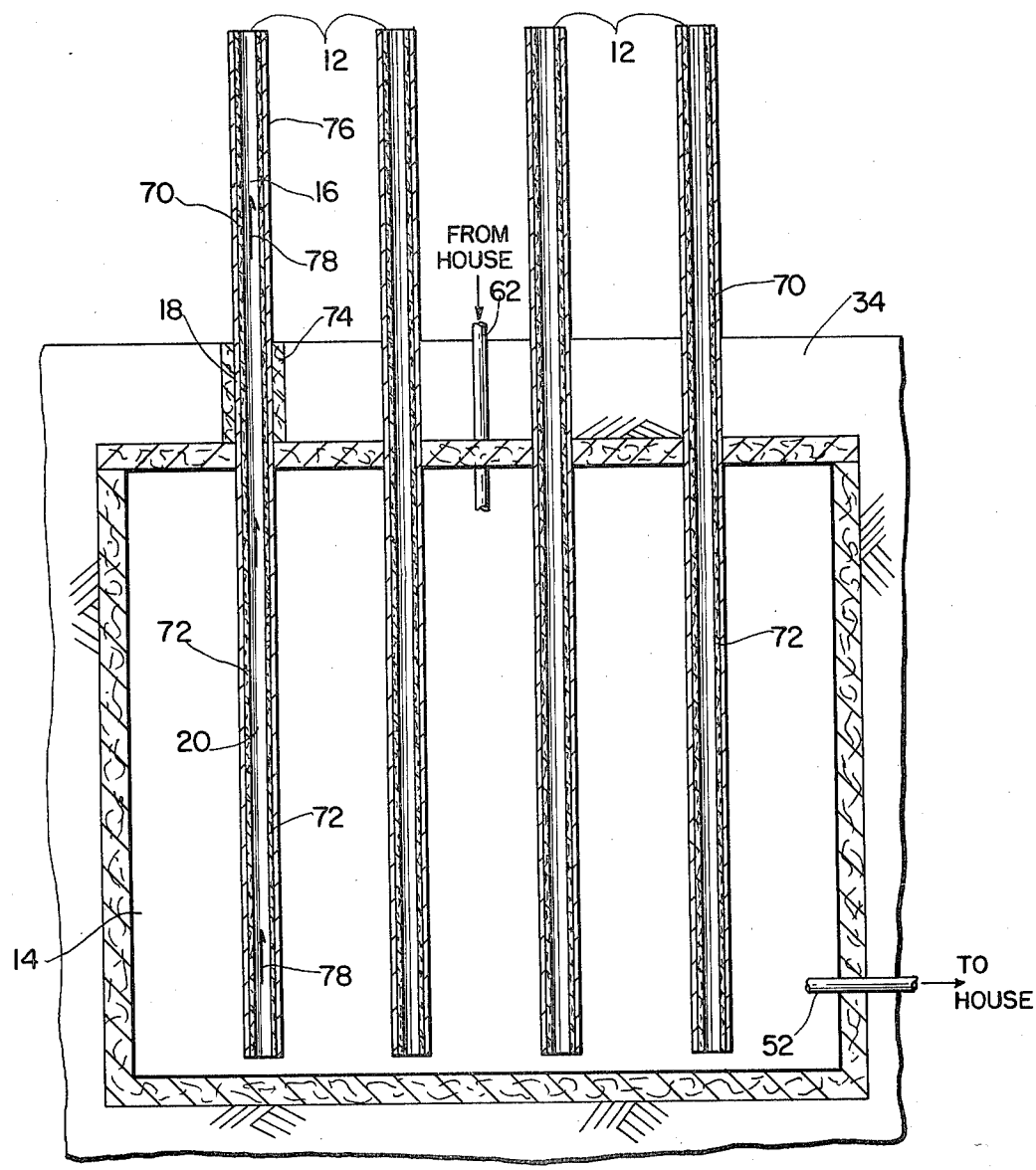
FIG. 3 is a diagrammatic vertical section of the cold storage unit of a system in accordance with present invention.

FIG. 3 illustrates the constructional details of a preferred heat pipes 12 utilized in the cold storage system 14. Each of the heat pipes 12 is closed at both ends includes a condenser section 16, an adiabatic section 18, and an evaporator section 20 as well as containing a working fluid (not illustrated). The heat pipe 12 is lined with a wick section 70 located in the condenser sections 16 and 72 in the evaporator section 20. It is to be noted that the adiabatic section 18 is surrounded by suitable insulation 74. The wicks or wick sections 70 and 72 may be made of metal, such as wire screen, sintered metal powder or fiber, or perforated sheets, or it may be made of a nonmetallic material such as felt, cloth, or fiber glass. The working fluid may require fluid with antifreezing characteristics depending on the geographic location of the system. However, only enough working fluid to saturate the wick is introduced into the heat pipe. The choice of the container, wick material, and working fluid combination is based on the operation and design criteria of the heat pipe application.

During cold seasons the winter cold above the ground surface is transferred by conduction through the outer walls 76 of the heat pipes 12 to the condenser section 16. This causes the vapor in the condenser sections 16 to condense and the condensed liquid in the wicks 70 to flow downward along the wicks 72 in the evaporator sections. The heat content of the water in the storage tank 14 causes the liquid in wicks 72 of the evaporator section to vaporize as indicated by arrows 78 (FIG. 3). As the vapor flows upwardly into the condenser sections 16, the subfreezing cold above the ground condenses it, and the condensed liquid returns back to the evaporator section through wicks 72. This constitutes the cooling and freezing process of the cold storage reservoir without any aid of energy operated pumps and controls.

When the temperature above the ground is higher than the temperature inside the cold storage tank 14, the operation of the heat pipes 12 would seem to be reversed from that operation as described above. However, in this case the condensed liquid in the sections 20 (now functioning as condenser sections) cannot rise up against gravity, and the heat pipes would cease to function. Hence, there will be no danger on warm days of losing the cold from the storage tank 14 to the warmer environment around the section 16 of the heat pipes.

While a preferred system and a preferred combination of heat pipes and two-phase flow pipes for use in such system have been illustrated and described, it is to be understood that various changes and arrangement of parts may be made without departing from the spirit and scope of the invention as defined in the appended claims.

I claim:

1. A system for extracting, transmitting, storing, recovering and utilizing cold, said system comprising:
   a. apparatus for extracting cold from the environment;
   b. transmitting means for transmitting said cold from environment above the ground to a location below the surface of the ground; said transmitting means comprising a heat pipe,
   c. storage means for storing cold, said storage means including a substance which is capable of changing phase, said substance being located at said location below the surface of the ground for receiving and storing cold transmitting thereto by said transmitting means;
   d. recovery means for recovering cold from said storage means and delivering it to a second environment; and
   e. utilizing means connected to said recovery means for receiving cold therefrom and dispersing said cold throughout said second environment.

2. A system as defined in claim 1 wherein said heat pipe includes a condenser section extending into the above-ground environment, an evaporator section extending into said substance of said storage means, and an adiabatic section connected between said condenser section and said evaporator section.

3. A system as defined in claim 1 wherein said storage means includes a plastic liner for containing said substance at said location below the surface of the ground.

4. A system as defined in claim 3 wherein said substance is water which changes phase to ice upon being cooled by said transmitting means.

5. A system as defined in claim 3 including insulation means located about said plastic liner for minimizing loss of cold to the surrounding earth and for compensating for expansion of said substance caused by a phase-change from liquid to solid.

6. A system as defined in claim 1 wherein said utilizing means includes two-phase flow pipe means, and means for passing relatively warm air across said flow pipes for cooling said air.

7. A system as defined in claim 6 wherein said recovery means includes a closed-circuit pipe means having a first portion thereof surrounded by said substance at said location below the ground, a second portion thereof extending from said location to said two-phase flow pipe means for delivering cold liquid thereto, and a third portion extending from said flow pipes back to said first portion for delivering vapor from said flow pipes to said first portion.

8. A system as defined in claim 7 including pump means located in said second portion of said closed-circuit pipe means for pumping said liquid through said second portion to said two-phase flow pipe means.

9. A system as defined in claim 6 wherein said two-phase flow pipe means include wick means for absorbing liquid.

10. A system as defined in claim 6 wherein said flow pipe means includes a manifold and a plurality of flow pipes connected to said manifold, each of said flow pipes containing wick means therein; and said recovery means including pump means for pumping liquid from said location below the ground to said manifold.

11. A system as defined in claim 10 including a thermostat control means connected to said pump means.

* * * * *